United States Patent [19]

Chen

[11] Patent Number: 4,765,550
[45] Date of Patent: Aug. 23, 1988

[54] MILL ROLL

[76] Inventor: Irving C. Chen, No. 279, Liu-Ho 2nd Road, Kaohsiung, Taiwan

[21] Appl. No.: 8,266

[22] Filed: Jan. 29, 1987

[51] Int. Cl.$^4$ .............................................. B02C 4/30
[52] U.S. Cl. .................................. 241/293; 29/121.5; 29/121.6; 100/121; 100/174
[58] Field of Search ............................ 241/293, 85, 86; 29/121.6, 121.7, 110, 130, 121.5; 100/121, 176, 155 R; 99/509; 127/5, 6; 162/358

[56] References Cited

U.S. PATENT DOCUMENTS

| | | | |
|---|---|---|---|
| 1,700,571 | 1/1929 | Milne | 29/121.7 |
| 1,908,519 | 5/1933 | Leonard | 100/174 X |
| 3,217,387 | 11/1965 | Strindlund | 100/121 X |
| 3,969,802 | 7/1976 | Bouvet | 29/121.6 |
| 4,391,026 | 7/1983 | Casey et al. | 29/121.6 |

Primary Examiner—Mark Rosenbaum

[57] ABSTRACT

A juice extracting mill roll is provided with a plurality of juice channels connected with a plurality of juice inlet passages. The juice inlet passages have a longer dimension in an axial direction and a shorter dimension in a circumferential direction. Each juice inlet passage has a passage extension projecting into the juice channel to form a juice trap. Alternatively, a juice trap can be formed with each juice inlet passage intersecting the respective juice channel at a leading or lagging portion of the juice channel relative to the direction of rotation of the roll, and the opposite lagging or leading portion of the juice channel being shut off from the juice inlet passage.

21 Claims, 11 Drawing Sheets

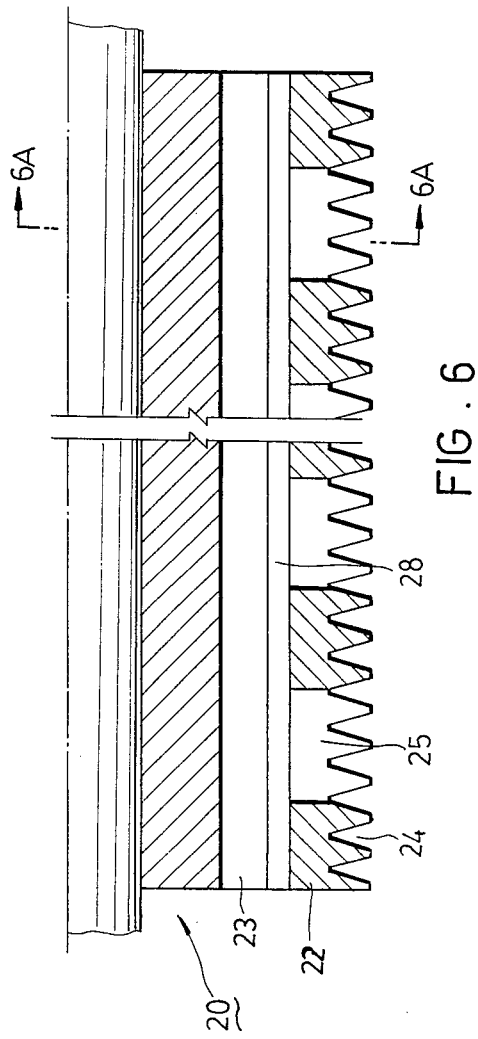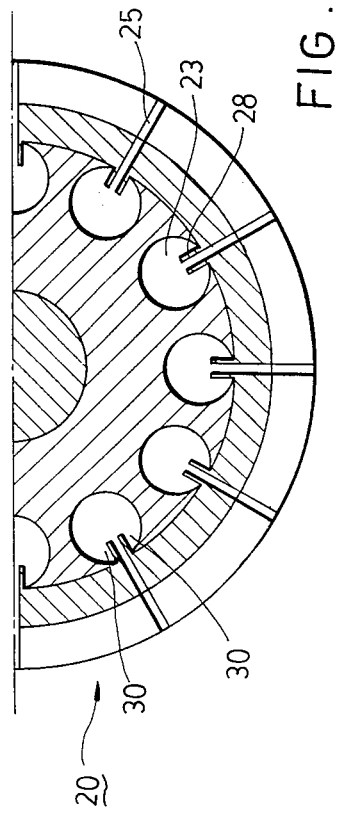

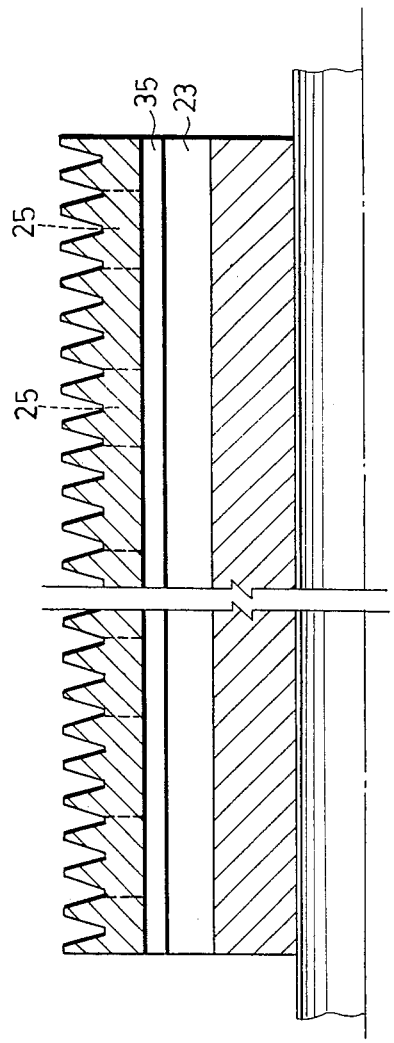
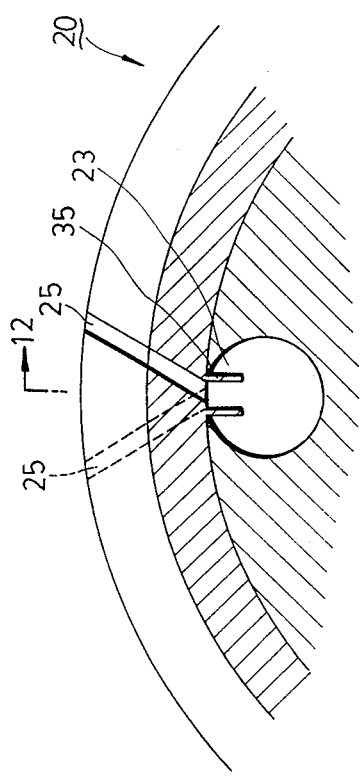
FIG. 12
FIG. 11

MILL ROLL

BACKGROUND OF THE INVENTION

1. Field of Invention

The present invention relates to the design and construction of a mill roll used for the grinding of a juicy material such as sugar cane, and for extracting the juice therefrom.

2. Prior Art

Conventionally, a mill for grinding a juicy material such as sugar cane consists of two or more inter-meshing rolls. The most basic types are the 2-roll type which includes a top roll and a bottom roll and the 3-roll type which includes a top roll and two bottom rolls. Generally, each roll comprises a forged steel shaft shrink fitted or otherwise sleeved with a cast iron cylindrical shell. The outer peripheral surface of the shell is formed with a plurality of circumferentially extending V-shaped grooves, evenly spaced axially. Through an appropriate power drive, the top and bottom rolls are rotated in such opposing directions that sugar cane being fed into the mill between the top and bottom rolls will be crushed and the juice contained therein extracted. The bottom roll is further provided with a plurality of the so-called 'messchaert grooves' along the bottom of the v-shaped grooves such that the extracted juice, flowing in these grooves, can be collected into the juice receiver underneath the mill.

An inherent disadvantage of this conventional mill is that a substantial amount of the extracted juice inevitably becomes trapped at the upper part of the cane blanket and can only reach the bottom roll by percolating through the cane blanket, so that much of the extracted juice is lost to reabsorption by the cane during the process. The accumulation of excess liquid also causes slippage of the rolls thereby adversely affecting milling capacity as well as extraction effectiveness.

An attempt to deal with these disadvantages of the conventional apparatus is disclosed in U.S. Pat. No. 3,969,802 wherein a top roll comprising a steel body with a plurality of peripheral grooves formed circumferentially thereon, has a plurality of channels within the body of the roll extending axially in the roll throughout the roll body, and a plurality of holes extending from the bottom of the grooves to communicate with corresponding channels in such a way that during operation, extracted juice can be injected radially inwardly through the holes into the channels and axially out the channels from both ends of the roll into the juice receiver. By so doing, recovery of the juice is increased. The walls of such holes are divergent in the radially inward direction and the juice channels are also divergent towards both ends of the roll.

To compensate for the inferior wearability of the steel material from corrosion and abrasion compared to cast iron, and the tendency for steel to become 'shiny' with use and therefore slippery, the sides of the grooves have to be spot-welded to increase their surface roughness and to minimize wear and slippage.

U.S. Pat. No. 4,391,026 follows the same operating principle of U.S. Pat. No. 3,969,802, but defines in greater details one elaborate method of constructing the divergent openings. According to this patent, the top roll consists of a shaft, a cylindrical roll body affixed to the shaft, a plurality of circumferentially extending v-grooves formed in the periphery of the roll body, a plurality of channels extending axially through the roll body at positions inwardly of the grooves, a plurality of radially extending circular recesses formed at locations spaced circumferentially around each said groove and each extending inwardly from the bottom of the respective groove to communicate with a respective channel through another circular hole smaller in diameter than the connecting recess, and a plurality of inserts, each of which is fitted and secured within a respective recess by weld refilling the v-groove surfaces destroyed by the recess, each said insert having an elongated opening with a substantially rectangular circumferential cross-section with a longer dimension extending substantially circumferentially of the roll body and a narrower dimension extending axially of the roll body, said rectangular opening being divergent towards the center of the roll.

While these arrangements have been an improvement over conventional mill rolls, several disadvantages still exist. For example, the holes still tend to become clogged and the manner of formation of the divergent openings and their subsequent maintenance and replacement are all tediously complicated. Furthermore, because both inventions call for a substantial amount of welding, steel instead of cast iron is chosen as the material for the shell because of its easier weldability. However, its inferior resistance to wear from corrosion and abrasion has costly consequences because of the high acidity and corrosiveness of the cane juice. Much more time and expense need to be devoted to the surface welding of the roll as part of its regular maintenance.

In addition, both patents have another common disadvantage in that once any row of openings on the roll has rotated past the pinch or point of maximum compression, extracted juice remaining in the channel not yet drained off from both ends of the roll tends to flow back through the openings and be reabsorbed by the compressed bagasse. FIGS. 1A and 1B show respectively a 2-roll and a 3-roll type mill in operation. When one of the circumferentially provided juice inlet openings 2 on top roll 1 has rotated past the pinch point 'x', the juice extraction pressure becomes drastically reduced. As a result, extracted juice not yet drained off from both ends of the roll and therefore still remaining in the axially formed juice channel 3 will tend to flow back out of the roll through various juice inlet openings 2 communicating directly with the channel 3 and be reabsorbed by the outgoing cane bagasse. Similarly; as is obvious from FIG. 1B, the same disadvantage exists for the 3- roll mill, seriously affecting its extraction effectiveness.

Furthermore, because the juice inlet openings of both patents are provided at the bottom of the circumferentially provided v-shaped grooves, the width of the juice inlet opening is limited by the width of the bottom of the v-shaped grooves and the length of the juice inlet opening is limited by the diameter of the juice channel. The total cross-sectional area of the juice inlet openings cannot therefore be effectively increased.

The present invention is an attempt by the applicant to overcome or alleviate the disadvantages of the prior art described above.

SUMMARY OF THE INVENTION

It is therefore a primary object of the present invention to provide a mill roll capable of being provided with a much larger total cross-sectional area of juice inlet passages than available from prior art such that extraction capacity and effectiveness can be substantially improved.

It is another object of the present invention to provide a mill roll in which the juice inlet passages have minimal risk of becoming clogged.

It is yet another object of the present invention to provide a mill roll which can be made of cast iron and can be manufactured with a simpler and less expensive procedure, without any need for welding.

It is a further object of the present invention to provide a mill roll capable of being used as a top roll or a bottom roll, individually with other conventional rolls or simultaneously with one another.

It is a yet further object of the present invention to provide a mill roll capable of effectively preventing the reabsorption phenomenon caused by the reverse outward flowing of extracted juice from a juice channel through connecting juice inlet passages.

The mill roll of the present invention includes a roll body having a plurality of juice channels axially extending throughout the length of the roll body and distributed annularly at positions inward of its peripheral surface, and a plurality of juice inlet passages communicating with and extending substantially radially outward from the juice channels to the outer periphery of the roll body, each spaced apart axially and circumferentially from one another. Each of the juice inlet passages shall preferably have a shorter dimension along the feeding direction of the material to be crushed and a longer dimension along the direction perpendicular to the feeding direction. Thus, to the extent the material to be crushed is fed in a direction perpendicular to the axis of the roll, each of the juice inlet passages shall have a longer dimension along the axial direction of the roll body and a shorter dimension along its circumferential direction. Each of the juice inlet passages opens at the peripheral surface of the roll body and communicates with at least one juice channel.

Certainly, the juice inlet passages can be aligned axially and circumferentially or aligned axially and staggered circumferentially. Each juice inlet passage can be of uniform or nonuniform cross-section. It can be divergent or convergent inwardly of the roll body, or converge at the intermediate portion thereof and diverge towards its inner and outer ends.

Also, the cross-section of each juice channel can be of any shape such as circular, elliptical, rectangular, trapezoidal and/or truncated sector-shaped, preferably of a shape having a longer dimension in a radial direction of the roll body and diverging outwardly of the roll body. The juice channels can be machined out or cast integrally with the roll body.

The outer surface of the roll body can further be provided with a plurality of grooves, preferably substantially V-shaped circumferential grooves, each of which being defined by two facing surfaces of a pair of flanks converging radially inward and a groove bottom between the flanks. Each of the juice inlet passages opens continuously at at least one groove bottom and/or at at least one portion of at least one flank of at least one groove. Preferably, the length of each juice inlet passage is approximately equal to several pitch distances of the grooves.

Furthermore, since the circumferential dimension of each juice inlet passage is small according to the present invention, each juice channel can be communicated with two or more axial rows of juice inlet passages to maximize the drainage frequency per roll rotation.

Therefore, along with the much longer length of the juice inlet openings, the total effective cross-section area of the juice inlet passages can be significantly increased, thereby drastically improving the drainage capacity and efficiency of the mill roll.

The roll body may further include a hollow insert body fitted in each of the juice inlet passages, the hollow insert body having an inner end extending a predetermined distance into the respective juice channel to form a juice trap. Alternatively, the roll body may include a tube-like projection extending a predetermined distance from the inner end of each juice inlet passage into the respective juice channel to form a passage extension in the juice channel to trap the extracted juice.

In another aspect of the invention, the juice trap can be formed by having each juice inlet passage intersect the respective juice channel at a leading or lagging end of the juice channel relative to the direction of rotation of the roll body, thereby shutting off the lagging or leading end from the juice inlet passage to form the trap.

The juice traps formed as described above provide the advantage that extracted juice remaining in the juice channel can be held temporarily in the juice traps until drained off from both ends of the roll body, thereby preventing such juice from flowing back out through the connecting juice inlet passages despite reduced crushing pressure.

Because the juice inlet passages of the present invention can be easily machined out of the roll body, the production procedure of the present invention is much less complicated than prior art and does not require any welding. Consequently the roll body can be made with cast iron which is cheaper and more wear- and corrosion-resistant than regular cast steel.

In addition, such a roll can certainly be used as a top or bottom roll, individually with other conventional rolls or simultaneously with one another.

The present invention will be best understood with reference to the accompanying drawings.

BRIEF DESCRIPTION OF THE DRAWINGS

FIG. 6 is a schematic sectional view showing a portion of the roll body of FIG. 3 which incorporates a channel-shaped member as a passage extension;

FIG. 6A is a fragmentary sectional view taken along line 6A—6A of FIG. 6;

FIG. 11 is a fragmentary view of a roll body in which each juice channel incorporates a channel-shaped member and communicates with two rows of juice inlet passages;

FIG. 12 is a fragmentary sectional view taken along line 12—12 of FIG. 11;

DETAILED DESCRIPTION OF THE PREFERRED EMBODIMENT

Although the following description relates to a mill roll used for the crushing of sugar cane, it is to be understood that the present invention may well be used for the grinding of any juicy material and the extraction of juice therefrom.

Figure 1A:
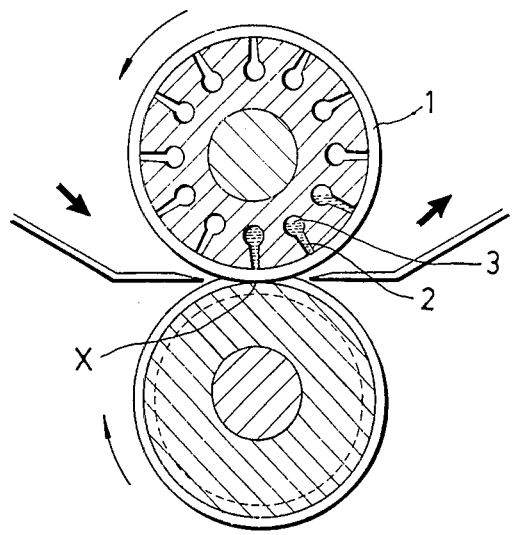
FIGS. 1A and 1B show rollers of conventional 2-roll mill and 3-roll mill.
Figure 1B:
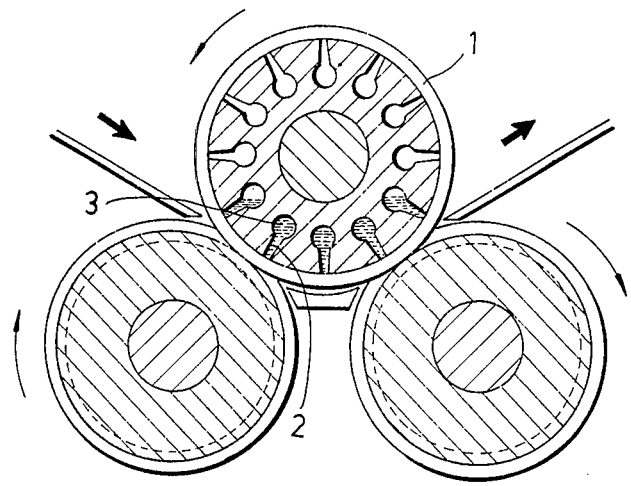
Figure 2:
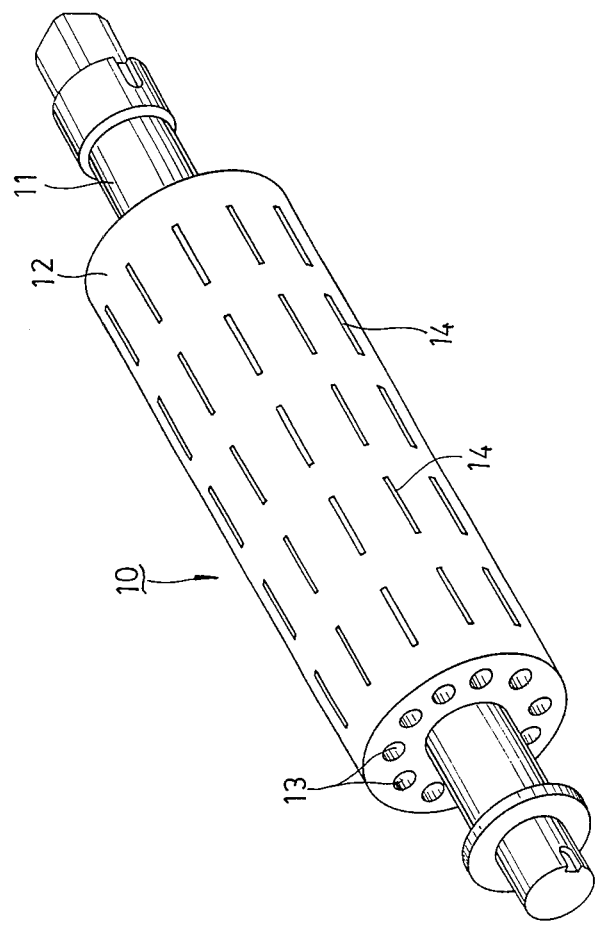
FIG. 2 is a perspective view of a roll body embodying the present invention.

As shown in FIG. 2, a mill roll 10 of the present invention includes a shaft 11 with a roll body 12 sleeved thereon. In the roll body 12 is formed a plurality of juice channels 13 axially extending throughout the length of the roll body 12 at positions inward of its peripheral surface, preferably distributed substantially annularly in the roll body. The cross-section of each juice channel 13 as shown is substantially circular. However, it can be of different other shapes such as elliptical, rectangular, trapezoidal and/or truncated sector-shaped, preferably one having a longer dimension in a radial direction of the roll body and diverging towards the periphery of the roll body. The juice channels 13 can be machined out or cast integrally with the roll body.

The outer peripheral surface of the roll body 12 is provided with a plurality of juice inlet passages 14 opening at the peripheral surface of the roll body 12, each having a longer dimension along the axial direction of the roll body and a shorter dimension along its circumferential direction. The juice inlet passages 14 are aligned substantially axially and circumferentially. Instead of the alignment of the inlet passages 14 as shown, the juice inlet passages 14 can also be arranged in a variety of other geometric formats. Each of the juice inlet passages 14 opens in a generally radially inward direction into the roll body such that each juice inlet passage 14 communicates with at least one juice channel 13.

Figure 3:
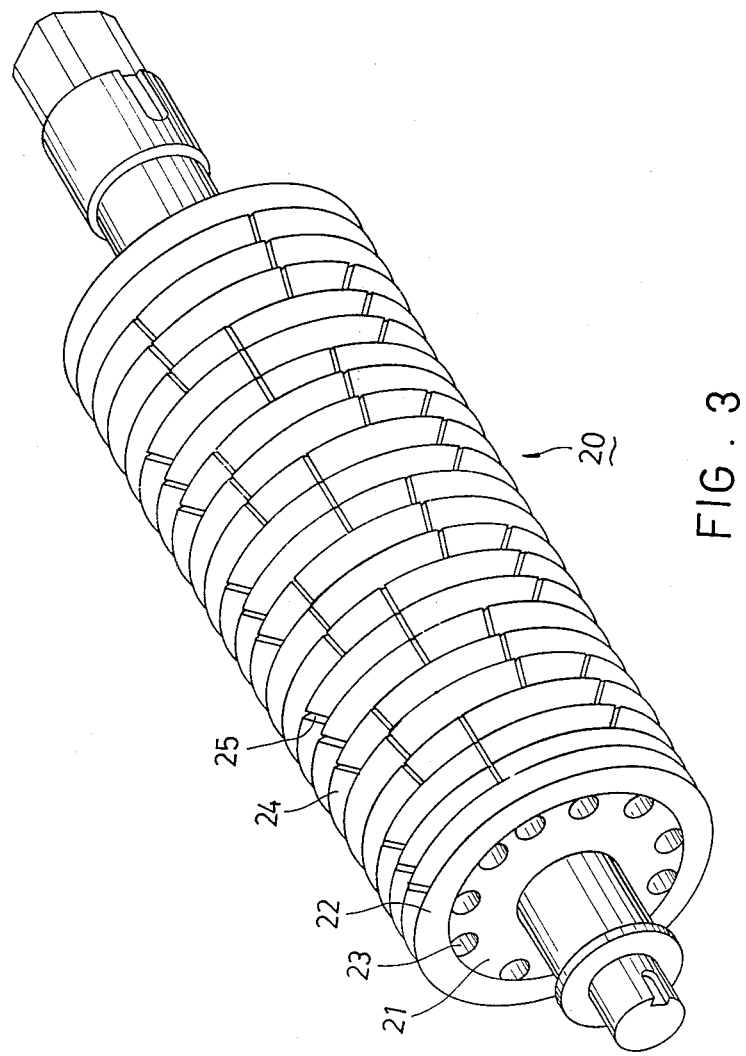
FIG. 3 is a perspective view of another roll body embodying the present invention.
Figure 3A:
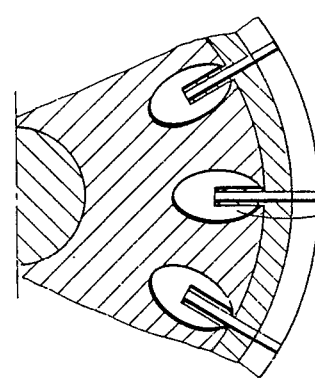
FIGS. 3A to 3C show different shapes of the cross-section of the juice channel of the roll body of FIG. 3.
Figure 3B:
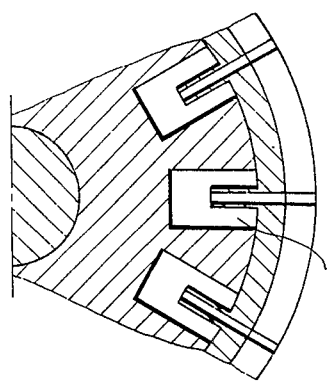
Figure 3C:
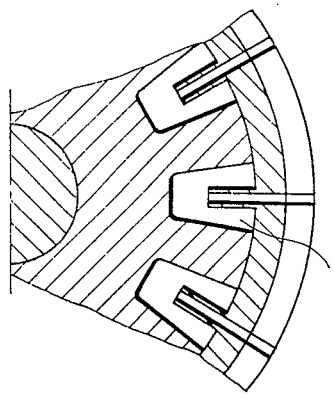
Figure 3D:
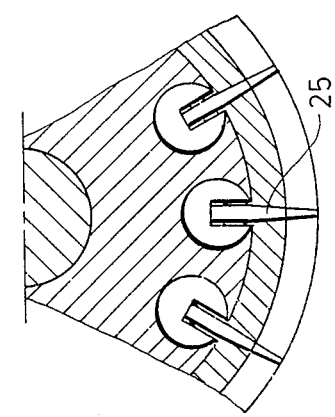
FIGS. 3D to 3F show different cross-sectional configurations of the juice inlet passages of the roll body of FIG. 3.
Figure 3E:
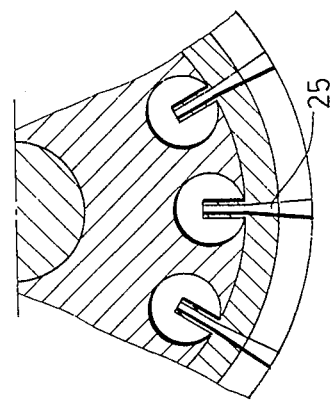
Figure 3F:
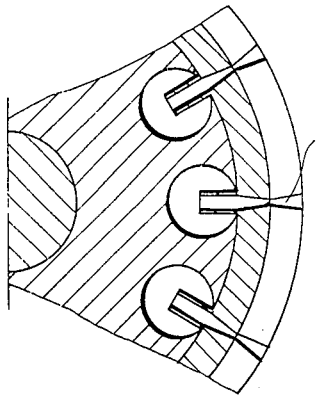
Figure 4:
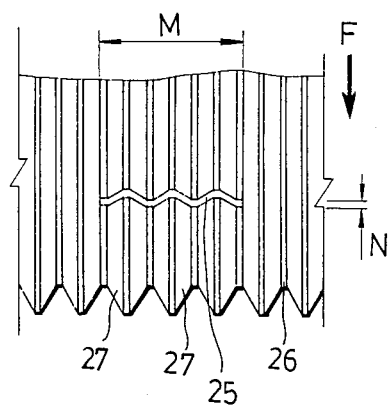
FIG. 4 is a schematic elevation view showing a portion of the roll body of FIG. 3.
Figure 5:
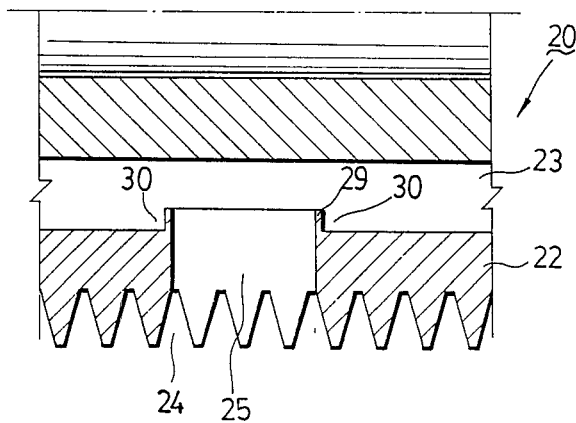
FIG. 5 is a schematic sectional view showing a portion of the roll body of FIG. 3 in which each inlet passage incorporates a passage extension.

FIGS. 3, 4 and 5 show an alternative embodiment of the present invention wherein a roll body 20 consists of the inner roll body 21 with a cylindrical outer shell 22 sleeved thereon. Said inner body 21 has a plurality of axially extending juice channels 23 annularly distributed on its peripheral surface. The outer shell 22 can be made of a variety of materials such as cast iron, steel or cement, and has formed on its peripheral surface a plurality of adjacent generally V-shaped grooves 24, each extending circumferentially and is defined by the surfaces of two adjacent flanks 27 and a groove bottom 26. The outer shell 22 is further provided with a plurality of juice inlet passages 25, each preferably having a longer dimension along the axial direction of the roll body and a shorter dimension along its circumferential direction. The juice inlet passages 25 are aligned substantially axially and are staggered with respect to the juice inlet passages 25 of an adjacent axial row in the circumferential direction of the outer shell 22. However, as with the embodiments shown in FIG. 2, the juice inlet passages 25 can also be arranged in a variety of other geometric formats. Unlike openings of the prior art which are confined to the bottom of the grooves, each juice inlet passage 25 in this embodiment opens continuously across four groove bottoms 26 and six flank surfaces 27. The length of a juice inlet passage 25 can vary from less than, equal to or greater than one pitch distance between the v-shaped grooves 24 to several pitches, preferably being of more than a single pitch. The cross-section of the juice inlet passages 25 can be uniform or nonuniform. In the latter case, each juice inlet passage 25 can diverge or converge inwardly in the roll body towards its respective connecting juice channel 23, or converge at an intermediate portion thereof and diverge towards its inner and outer ends, as is shown in FIGS. 3D, 3E and 3F. The cross-section of each juice channel 23 as shown is substantially circular. However, it can be of different other shapes such as elliptical (FIG. 3A), rectangular (FIG. 3B) and/or truncated sector-shaped (FIG. 3C), preferably one having a longer dimension in a radial direction of the roll body and diverging towards the periphery of the roll body.

Unlike openings of the prior art whose width is confined by the width of the bottom of the groove and whose length is confined by the width or diameter of the respective juice channel, the configuration of the juice inlet passage 14 or 25 of the present invention allows the passages to have a larger total cross-sectional area for juice extraction than that permissible by the prior art. Not only will this substantially increase the drainage of the extracted juice, thereby increasing the extraction effectiveness of the roll, it will also reduce the reabsorption and roll slippage phenomena exhibited by conventional rolls to a much greater extent than achievable by the prior art.

Another advantage of the present invention is its ability to prevent the juice inlet passages 14 or 25 from clogging. As can be seen from FIG. 4, the juice inlet passage 25 of the present invention has a longer dimension M along the axial direction of the roll body and a shorter dimension N along its circumferential direction. Since the juicy material to be crushed, such as sugar cane, is fed into the pinch between the mill rolls in the direction indicated by F, and the probability of sugar cane fibre or bagasse being forced into the juice inlet passages 25 is obviously a direct function of the length of the juice inlet passage 25 in the direction of the sugar cane's movement, the much smaller length of the juice inlet passage 25 of the present invention along direction N means a drastically reduced risk for clogging. Besides, unlike the circumferentially extending opening of the prior art whose length is confined by the width or diameter of each corresponding juice channel, the length of the juice inlet passage 25 of the present invention extends axially on the roll body and can span the groove bottom and flank surfaces of several grooves, resulting in a much larger total space inside the juice inlet passage 25 than ever possible before. Thus, even in the unlikely event that strips of the cane fibre or bagasse get inside the juice inlet passage 25, the larger total internal space of the juice inlet passage of the present invention allows the strips to be dispositioned and flushed out through the juice channel much more readily than would be the case with juice inlet opening of the prior art, whose restricted space causes the strips to get stuck in the opening, leading eventually to complete clogging.

As shown in FIG. 5, each juice inlet passage 25 is preferably provided with a passage extension 29 which extends an appropriate distance from the inner end of the juice inlet passage 25 into the juice channel 23 in the form of a projection conforming to a segmented tube such that a juice trap 30 can be formed inside the juice channel 23. Each projection forming the passage extension 29 is of one piece with the roll body and can be integrally cast with the juice channel 23 or otherwise affixed to the juice channel 23 by other techniques. When the juice inlet passage 25 rotates past the pinch point between the top and bottom rolls and the crushing pressure greatly reduced, the extracted juice remaining in the juice channel 23 not yet drained off from both ends of the roll body will be held in the juice trap 30 inside the juice channel 23 until eventually drained off from both ends of the roll. Despite the open communication between the juice channel 23 and the respective juice inlet passages 25, juice left in the juice traps 30 will not flow back into the crushed bagasse through the inlet passages 25 because of the higher position of the intersecting opening between the passage extension 29 and the juice channel 23 relative to the level of the trapped juice inside the same juice channel 23. A substantial amount of extraction which is normally lost through reabsorption of such reverse flowing juice can thus be avoided with the present invention.

FIGS. 6 and 6A show an alternative arrangement for forming a juice trap in the juice channel 23. A one piece channel-shaped member 28 integrally cast with the juice channel 23 or otherwise affixed to the juice channel 23 by welding or other suitable techniques is formed to project an appropriate distance into the juice channel 23 from the inner ends of the juice inlet passages 25. Extending axially throughout the length of the juice channel 23, the channel-shaped member 28 communicates with the entire axial row of the juice inlet passages 25 and therefore serves as a common passage extension and provides juice traps for all said juice inlet passages 25 along the same juice channel 23.

Figure 7:
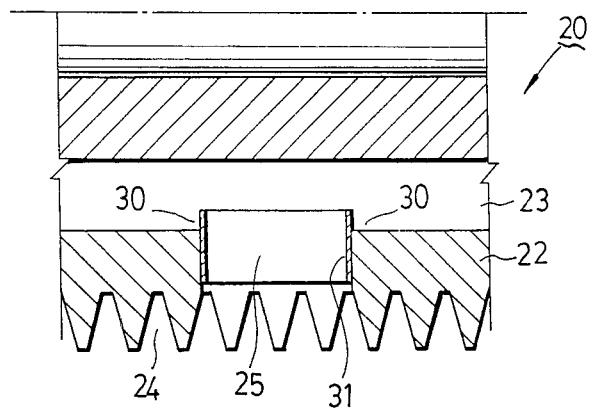
FIG. 7 is a schematic sectional view showing a portion of the roll body of FIG. 3 in which each inlet passage incorporates an insert body.

FIG. 7 shows another alternative arrangement for forming a similar juice trap 30 in the juice channel 23. A hollow insert body 31 is tightly fitted against the walls of the juice inlet passage 25, the inner end of the hollow insert body 31 protruding an appropriate distance into the respective juice channel 23, forming a passage extension and consequently a juice trap 30 in the juice channel 23. The insert body 31 is affixed against the juice inlet passage 25 by force fitting or other techniques such that it will not be dislocated during the milling operation.

Figure 8:
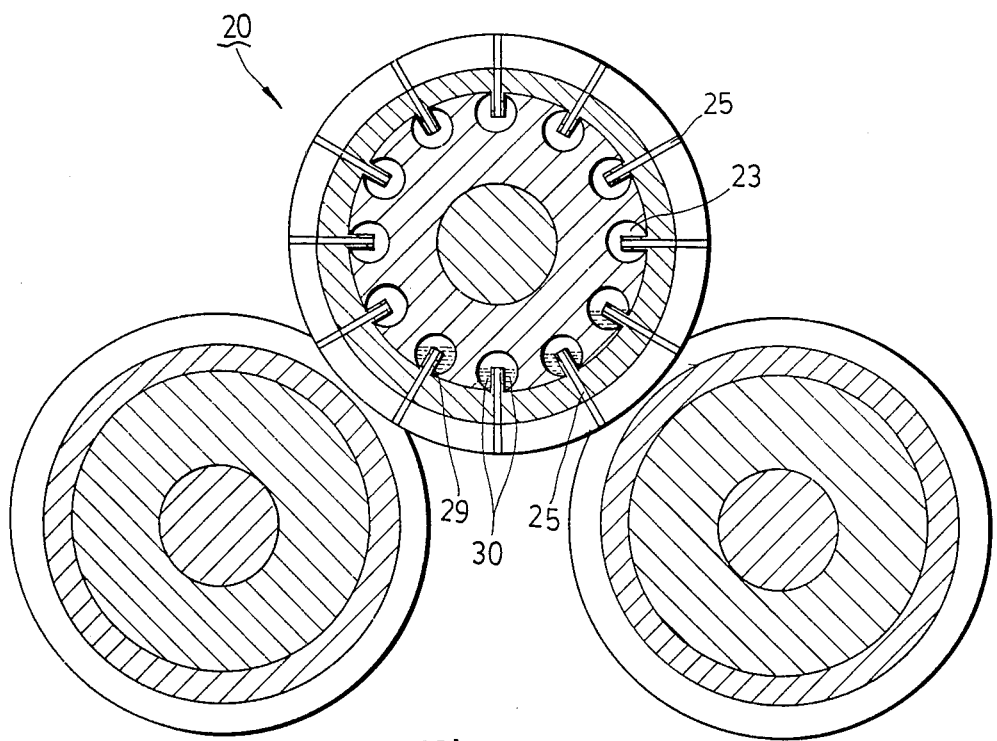
FIG. 8 is a fragmentary schematic sectional view showing roll bodies of a 3-roll mill incorporating the present invention.
Figure 14:
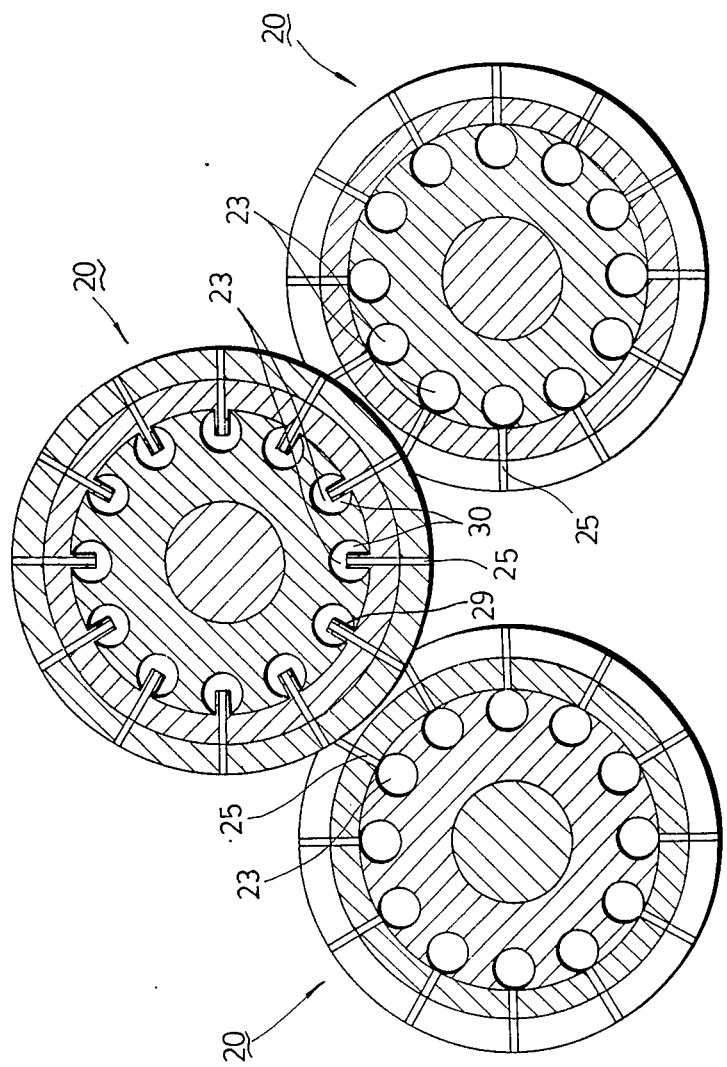
FIG. 14 is a sectional view taken along line 14—14 of FIG. 13.

The arrangements for forming the juice traps as described above can be used for rolls of both 2-roll and 3-roll mills, but are particularly suited for 3-roll mills (see FIGS. 8 and 14). The above-mentioned passage extension 29 may have a cross-section substantially the same as that of the juice inlet passage 25 or a flaring shape to enhance its juice trapping effectiveness.

Figure 9:
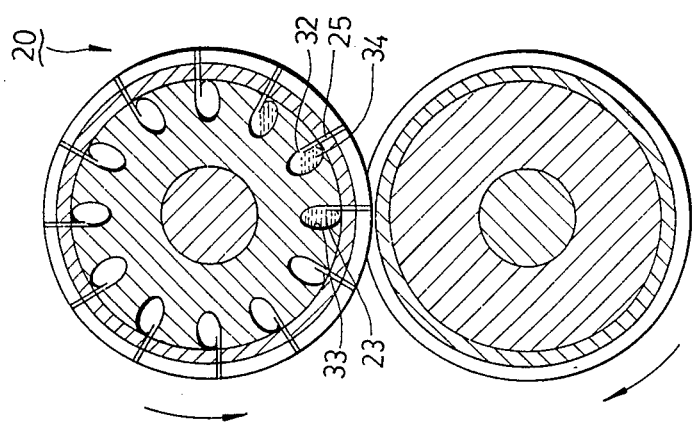

FIG. 9 shows yet another alternative arrangement for forming a juice trap in the juice channel 23 of the roll body 20 which is particularly suited for two-roll mills. Here, each juice inlet passage 25 intersects a leading end 32 of the juice channel 23 relative to the direction of rotation of the roll such that the lagging end 33 of the juice channel 23 relative to the rotation of the roll can be shut off from the juice inlet passage 25 to form the juice trap 34 is formed. The juice channel 23 as shown is substantially elliptical in cross-section and the juice inlet passage 25 can extend substantially tangentially from the leading side of the periphery of the juice channel 23 relative to the rotation of the roll. However, the cross-section of the juice channel 23 can also be of different other shapes such as rectangular, elliptical, trapezoidal and/or truncated sector-shaped. Like juice traps 30 shown in FIGS. 5 and 7, the juice trap 34 can hold the extracted juice remaining in the juice channel 23 until eventually drained off from both ends of the roll. A substantial amount of extraction normally lost through reabsorption of such reverse flowing juice can thus be avoided, resulting in a corresponding increase in extraction and decrease in bagasse moisture.

Figure 10:
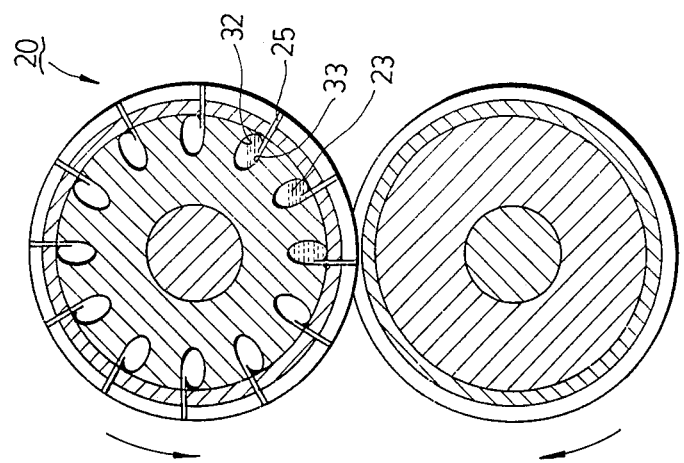
FIGS. 9 and 10 are schematic sectional views showing roll bodies of 2-roll mills whose top rolls incorporate juice traps formed according to the present invention.

As shown in FIG. 10, the inner end of the juice inlet passage 25 can also be connected to the lagging end of the juice channel 23 as to form a similar juice trap in the leading end of the juice channel 23.

Since the dimension of juice inlet passages 14 or 25 of the present invention are small in the circumferential direction, it is possible to conveniently position two or more rows of such substantially axially disposed juice inlet passages 14 and 25 to connect with a single juice channel 13 or 23. Thus, unlike the prior art which provides for just one row of juice passages per juice channel, for the same total number of juice channels 13 or 23 on each roll body, the total number of rows of juice inlet passages 14 and 25 can be significantly increased with the present invention. The consequent increase in the frequency of juice inlet passages passing under the pinch point per revolution along with the much greater total passage area of juice inlet passages result in a marked improvement in the amount of juice capable of being extracted over any given time period. Extraction effectiveness increases and the traditional reabsorption and slippage problems can be further alleviated.

FIGS. 11 and 12 show a preferred way of distributing the juice inlet passages 25 in the roll body 20 when two rows of juice inlet passages 25 are communicated with a single juice channel 23. In this case, juice inlet passages 25 of the two adjacent axial rows are staggered relative to one another in the circumferential direction of the roll body 20. Each juice inlet passage 25 extends from the juice channel 23 in a direction inclining to a radial line of the roll body 20 that passes through the connecting point of the juice inlet passage 25 and the juice channel 23. Each of the inner ends of the juice inlet passages 25 of the two adjacent axial rows open into the juice channel 23 through a passage extension 35 which has the same construction as the one piece channel-shaped member 28 of FIG. 6. Passage extensions of the construction shown in FIGS. 5 and 7 can also be employed.

While two adjacent axial rows of juice inlet passages 25 are illustrated to communicate with the same juice channel 23 hereinabove, the invention is not limited only thereto. Each juice channel 23 can also be communicated with three or more adjacent axial rows of juice inlet passages 25.

Figure 13:
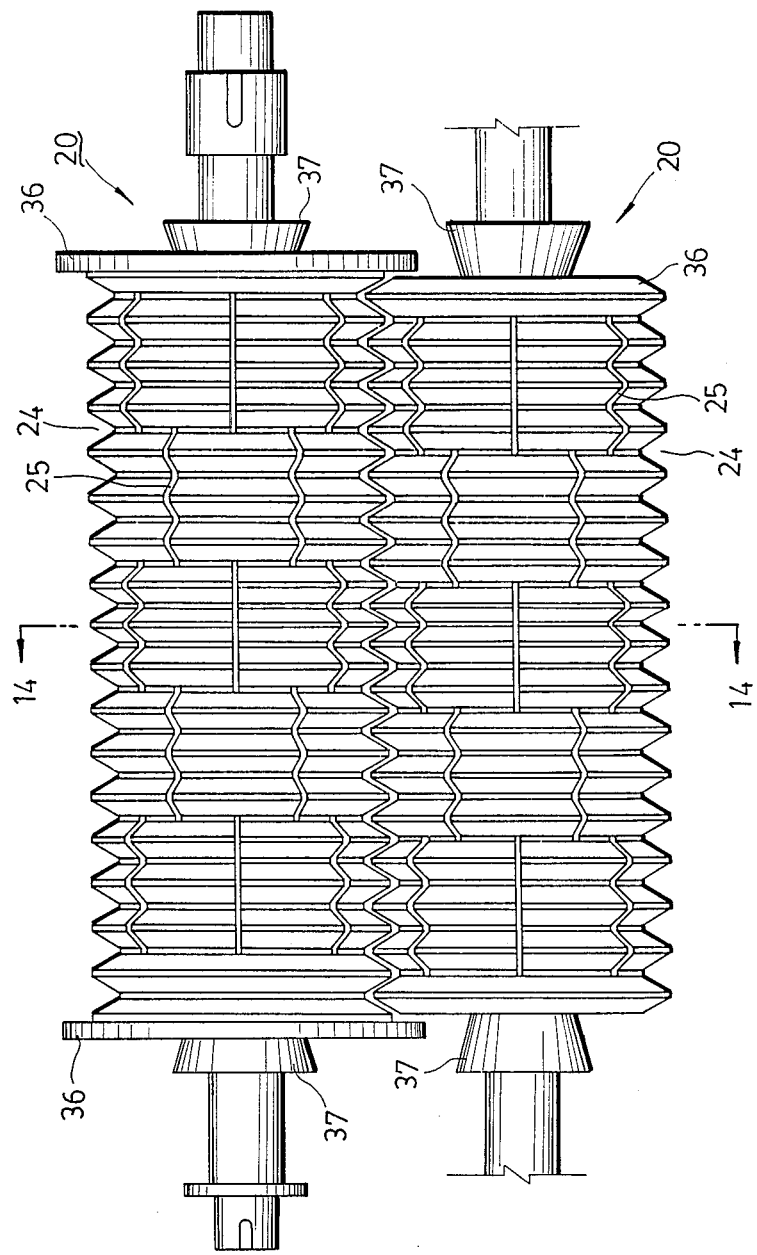
FIG. 13 is a schematic elevation view of the roll bodies of a 3-roll mill incorporating the present invention.

The roll bodies of the present invention can be used individually with other conventional rolls or simultaneously as both top and bottom rolls as shown in FIGS. 13 and 14. In the Figures, parts which are the same as those described above are represented by the same numerals. Roll bodies 20 are used as both top and bottom rolls. Flanged members 36 are affixed to both ends of the top roll 20, and, to protect the shaft of the top and bottom rolls 20 from contamination by the extracted juice, rings 37 are provided at both ends of each roll 20. Grooves 24 of the top roll 20 are meshed with grooves 24 of the bottom rolls 20. When a juicy material such as sugar cane is crushed, the extracted juice, under tremendous crushing pressure, enters the juice inlet passages 25 and juice channels 23 of both the top and the bottom rolls to flow out from both ends of the rolls. The extracted juice can also follow the V-shaped grooves of the bottom rolls into the juice receiver underneath the mill. When used as a bottom roll, this invention can also be applied concurrently with the conventional 'messchaert grooves'.

Although the present invention has been described with respect to what are presently considered to be the most practical and preferred embodiments, it is to be understood that the invention is not to be limited to the disclosed embodiments and should and does cover modifications and equivalent arrangments included within the spirit and scope of the appended claims whose scope is to be accorded the broadest interpretation so as to encompass all such modifications and equivalent structures, including any and all modifications which are conventional in the art relating to the present invention, such as though not limited to, the provision of 'chevron' or 'Kay' grooves on the roll surface.

What I claim is:

1. A mill roll for grinding a material containing juice, such as sugar cane, comprising: a shaft; and a roll body on said shaft, said roll body having an outer peripheral surface, a plurality of juice channels respectively extending axially over the length of said roll body and located at positions inwardly of, and at a distance from, the outer peripheral surface of said roll body, and a plurality of axially spaced, individual, separate juice inlet passages extending from the juice channels outwardly to the outer peripheral surface of said roll body, each of said juice inlet passages being longer in axial than in circumferential direction of said roll body, but considerably shorter than the respective juice channel, said outer peripheral surface being closed except for said spaced juice inlet passages, to thereby reduce risk of clogging of said juice inlet passages and of flow back of juice from said juice channels to said peripheral surface.

2. A mill roll as claimed in claim 1, wherein said peripheral surface has a plurality of substantially V-shaped circumferential grooves, each of said V-shaped grooves being defined by a pair of flanks and a groove bottom between said flanks, each juice inlet passage extending over at least one groove bottom and at least a portion of at least one of said flanks.

3. A mill roll as claimed in claim 2, wherein said roll body is constituted of an internal roll which bears said juice inlet channels therein, and an outer shell sleeved on said internal roll and bearing said V-shaped grooves on the outer peripheral surface of said outer shell and said juice inlet passages through said outer shell.

4. A mill roll as claimed in claim 2 or 3, wherein each of said juice inlet passages has a length of at least one pitch distance between adjacent V-shaped grooves.

5. A mill roll as claimed in claim 1, 2 or 3, wherein each juice channel is longer in radial direction than in circumferential direction of said roll body.

6. A mill roll as claimed in claim 5, wherein the cross-section of each of said juice channels is elliptical.

7. A mill roll as claimed in claim 5, wherein the cross-section, of each of said juice channels diverges towards the peripheral surface of said roll body.

8. A mill roll as claimed in claim 7, wherein the cross-section of each of said juice channels is trapezoidal.

9. A mill roll as claimed in claim 1, 2 or 3, wherein the juice inlet passages are aligned substantially axially and circumferentially.

10. A mill roll as claimed in claim 1, 2 or 3, wherein the juice inlet passages are substantially aligned axially and staggered circumferentially.

11. A mill roll as claimed in claim 1, 2 or 3, wherein each of said juice inlet passages includes a hollow insert body fitted therein, said hollow insert body having an inner end extending into the respective juice channel to a predetermined distance.

12. A mill roll as claimed in claim 1, 2 or 3, wherein said roll body further has a tube-like projection extending from the inner end of each of juice inlet passages into the respective juice channel to a predetermined distance, forming a tubular passage extension in said juice channel.

13. A mill roll as claimed in claim 1, 2 or 3, comprising channel-shaped members extending axially substantially over the full length of said juice channels and projecting inwardly from the inner periphery of said juice channels a predetermined distance, said elongated channel-shaped members being communicated with inner ends of at least one axial row of said juice inlet passages.

14. A mill roll as claimed in claim 1, 2 or 3, wherein each of said juice inlet passages intersects, a respective juice channel at a leading portion of said juice channel relative to the direction of rotation of said roll body, said juice channel having a lagging portion being shut off from said juice inlet passage to form a juice trap.

15. A mill roll as claimed in claim 1, 2 or 3, wherein each of said juice inlet passages intersects a respective juice channel at a lagging portion of said juice channel relative to the direction of rotation of said roll body, said juice channel having a leading portion being shut off from said juice inlet passage to form a juice trap.

16. A mill roll as claimed in claim 1, 2 or 3, wherein each of said juice channels is communicated with at least one axial row of said juice inlet passages.

17. A mill roll as claimed in claim 1, 2 or 3, wherein each of said juice channels is communicated with at least two axial rows of said juice inlet passages which are staggered circumferentially relative to each other.

18. A mill roll as claimed in claim 1, 2 or 3, wherein each of said juice channels is communicated with at least two axial rows of said juice inlet passages which are aligned circumferentially relative to each other.

19. A mill roll as claimed in claim 1, 2 or 3, wherein each of said juice inlet passages diverges inwardly in said roll body towards the respective said juice channel.

20. A mill roll as claimed in claim 1, 2 or 3, wherein each of said juice inlet passages converges inwardly in said roll body towards the respective said juice channel.

21. A mill roll as claimed in claim 1, 2 or 3, wherein each of said juice inlet passages converges at an intermediate portion thereof, and has one end portion diverging inwardly in said roll body towards the respective said juice channel and another end portion diverging outwardly in said roll body towards the outer peripheral surface of said roll body.

* * * * *